United States Patent [19]

Strizki

[11] 4,071,970
[45] Feb. 7, 1978

[54] HINGE PLATE FOR ROADSIDE POST SAFETY BREAKAWAY SYSTEM FOR SIGN PANELS AND THE LIKE

[75] Inventor: Richard A. Strizki, Ringoes, N.J.

[73] Assignee: Transpo-Safety, Inc., New Rochelle, N.Y.

[21] Appl. No.: 680,753

[22] Filed: Apr. 27, 1976

[51] Int. Cl.² .............................................. G09F 7/18
[52] U.S. Cl. ......................................... 40/607; 403/2; 40/610
[58] Field of Search ............ 40/145 R, 145 A, 125 H, 40/125 N, 125 R, 125 K; 403/2, 312, 309

[56] References Cited

U.S. PATENT DOCUMENTS

| | | | |
|---|---|---|---|
| 3,820,906 | 6/1974 | Katt | 40/145 R X |
| 3,846,030 | 11/1974 | Katt | 403/2 |
| 3,866,367 | 2/1975 | Strizki | 40/145 R X |
| 3,912,404 | 10/1975 | Katt | 403/2 |

Primary Examiner—John F. Pitrelli
Attorney, Agent, or Firm—Lackenbach, Lilling & Siegel

[57] ABSTRACT

An integral hinge is described which is adapted to be used in conjunction with a roadside post safety breakaway system for sign panels and the like. The integral hinge plate is generally rectangular in configuration and planar and is provided with a notch or groove extending thereacross which represents a weakened line portion about which the two halves of the hinge may bend or at which point the hinge may be severed in tension. The hinge plates are fixedly mounted on opposite sides of each of the posts supporting the sign panel or the like. The material and configuration of the hinge plates and the notches or weakened line portions are selected to cause the hinge plates mounted on the impact side of the posts to rupture at the notches or weakened line portions while causing the hinge plates mounted on the side of the post opposite to the impact side to bend. In this manner, impact by a moving vehicle with a post and severance of the breakaway means severs the hinge plates on the impact side and permits the vehicle to deflect the impacted post about the hinge plates on the opposite side while the post remains attached to the sign panel or the like to prevent secondary collisions with the advancing vehicle or other objects or persons in the immediate collision area.

18 Claims, 10 Drawing Figures

U.S. Patent  Feb. 7, 1978  Sheet 1 of 4  4,071,970
FIG. 3
FIG. 1
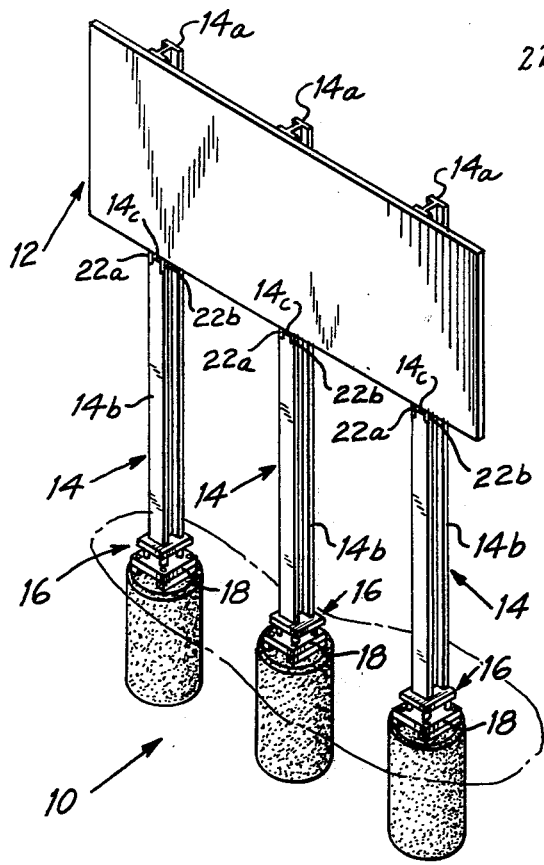
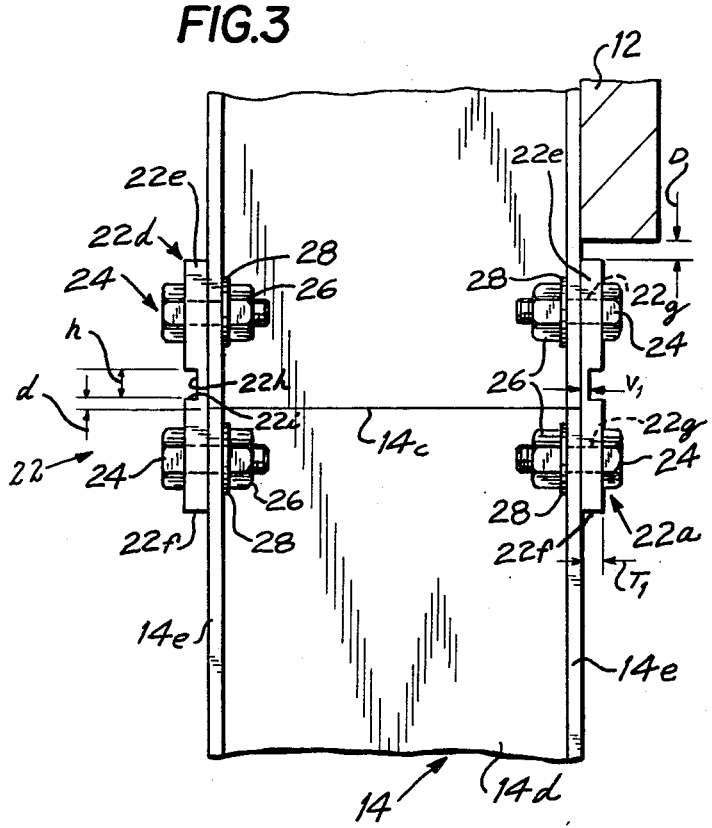
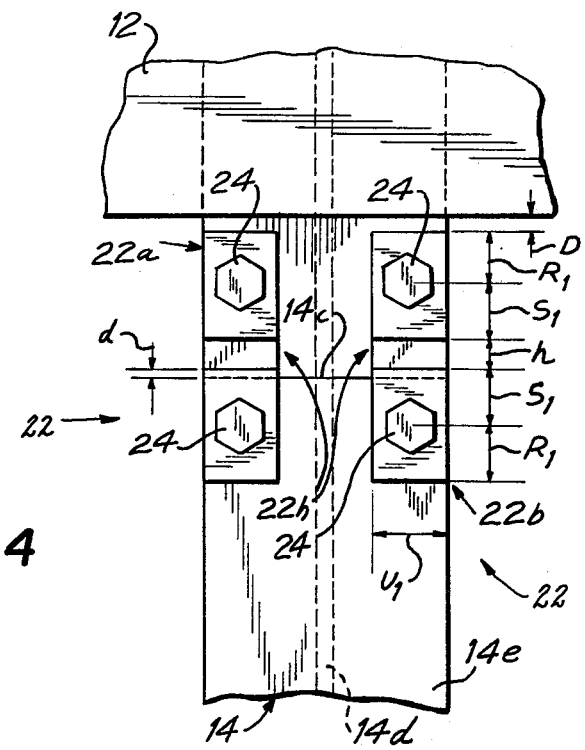
FIG. 4

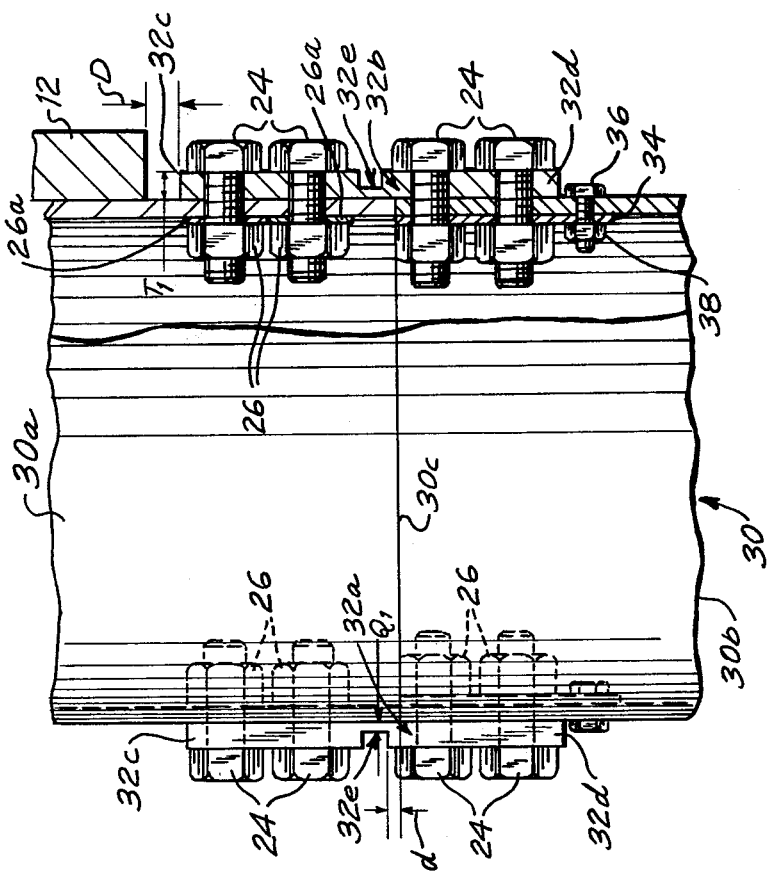
FIG. 6
FIG. 5
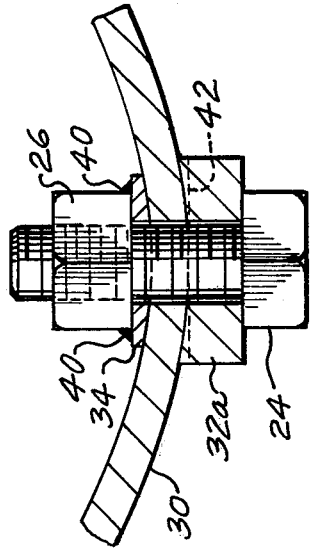
FIG. 7

HINGE PLATE FOR ROADSIDE POST SAFETY BREAKAWAY SYSTEM FOR SIGN PANELS AND THE LIKE

BACKGROUND OF THE INVENTION

The present invention generally relates to roadside post safety breakaway systems for panels and the like, and particularly to hinge plates for such systems which permit an impacted lower post portion to be releasably displaced upon impact by an advancing vehicle without being totally separated from the panel or the like.

A substantial effort has been made by the various governmental agencies in charge of highway safety to minimize injury to person and property upon the collision of a moving vehicle with a roadside post. Towards this end, numerous breakaway systems have been developed which releasably support roadside posts. Upon collision of a vehicle with one such post, the breakaway assemblies are designed to give way and release the post from the ground or footing on which it is supported. In this manner, the post presents a minimal amount of resistance to the advancing vehicle and the amount of injury to person and property is minimized. Breakaway assemblies of the type under discussion are disclosed in my U.S. Pat. No. 3,951,556, dated Apr. 20, 1976, entitled "Load Concentrated Breakaway Coupling Apparatus," and my U.S. application Ser. No. 574,247 filed May 2, 1975, which issued as U.S. Pat. No. 3,967,906 on July 6, 1976 for "Safety Breakaway Ground Mounted Post Support Assemblies."

While breakaway assemblies of the type above suggested result in ready displacement of sign panel-supporting posts to minimize damage to the automobile and injury to its occupants, a further problem exists in that these posts, once released from their footings, could become flying missiles which can result in secondary collisions with the impacting vehicle or injury to an individual. Also the sign panel provides additional resistance to the impacting vehicle, this increasing the degree of injury or damage. To avoid such total separation of the posts from the sign panel assembly, there has been developed a "fuse plate" which is used in conjunction with signposts partially cut along their depth in the region proximate to the bottom of the sign panel, the cut being effected from the side of the post at which impact is anticipated and terminating short of the opposite side. A fuse plate, which is a generally rectangular plate provided with drilled holes on the upper portion thereof and elongate slots which open at the bottom edge of the fuse plate are used to bridge the cut line of the post at the front side of the post, with the portion of the fuse plate through which the holes are drilled being fixedly secured to the post portion above the cut line and the elongate slots being directed downwardly below the cut line of the post. Bolt and nut combinations are used to secure the lower or slotted part of the fuse plate to the lower post portion, the nuts being pre-tensioned to a desired degree so that, with known ranges of friction between the bolts and the fuse plate, impact of a vehicle on the cut side of the post causes the post portions on the impact side of the cut line to separate and the post portions to bend about the uncut portion of the post. The fuse plate portion of this slip base system was developed by the Texas Highway Department and tested by the Texas Transportation institute. However, the operation of such slip base system is critically dependent upon the pre-tensioning or residual tension to which the bolts are tightened. Such tightening of the bolts is normally required in the field by utilizing special methods and equipment. Additionally, the degree of pre-tensioning varies with different bolt sizes and fuse plates. An additional disadvantage of the slip base system which utilizes fuse plates of the type discussed above is that proper operation of the system is based upon assumed values of coefficients of friction between the fuse plate and the pretensioned bolts and nuts. However, being outdoors and exposed to the elements, the fuse plates can become wet, can form rust or other deposits of dirt or the like, all of which effect or modify the coefficients of friction. For these reasons, the use of fuse plates is not as reliable as might be desired and the points at which the fuse plates will slip to permit bending of the uncut post section are not always predictable and are operational in only a limited impact area.

Another approach which has been proposed to prevent total separation of the impacted post from the sign panel assembly includes the use of integral hinge plates which are substantially rectangular and similar to the above-described fuse plates. However, the integral hinge plates are typically provided with drilled holes on both upper and lower halves, which halves are separated by a notch or groove which represents a weakened line portion of the hinge plate. These integral hinge plates are used to connect the upper and lower post portions of a completely cut post to maintain the upper and lower post portions together. With this proposed arrangement, the hinge plates bridge the post cut line and are disposed on opposite sides of the post. The integral hinge plate is connected to the upper and lower post portions by means of bolts and castillated nuts which are tightened only finger tight so as not to apply pre-tension or residual tension upon the hinge plates. With this approach, the hinge plate is intended to shear the associated bolt when sufficient tension is applied to that respective side of the post. The notch or groove provided in the hinge plate is only used to facilitate bending of the same on the side of the post opposite to the impact side. As mentioned, on the impact side, the hinge plate is designed to sever the bolt which connects it to the post. In this manner, the upper and lower post portions abutting against each other on the impact side separate upon impact while the lower released post portion remains attached to the upper post portion and bends about the hinge plate on the side opposite to the impact side. The design of the hinge plate for use with castillated nuts as described is such that the hinge plate will sever the bolts upon impact while being capable of bending about the notch or groove.

A major disadvantage with the castillated nut approach is that the nuts must be tightened so as not to apply any appreciable residual tension on the hinge plates so as to permit the hinge plates to move freely to sever the bolts upon impact. However, such loose coupling of the hinge plates to the post portions does not fix the upper and lower post portions to each other with the degree of security desired. The castillated nuts are subject to slight rotations on the bolts. Such movements of the nuts may change the degree of pre-tension which is applied to the hinge plate and, again, the operating characteristics of the system is not as fully predictable as may be desired. Also, different sized bolts above and below the post cut must be used made of different steels. If someone were to use the improper bolt steel on the bolts which sever, the hinge would not function in the specified limits and might fail under wind load or cause additional damage on vehicle impact.

SUMMARY OF THE INVENTION

Accordingly, it is an object of the present invention to provide a hinge plate for use with roadside post safety breakaway systems for sign panels and the like which does not have the above-described disadvantages associated with comparable prior art devices.

It is another object of the present invention to provide a hinge plate which is simple in construction and economical to manufacture;

It is still another object of the present invention to provide a hinge plate which reliably severs in tension;

It is yet another object of the present invention to provide a hinge plate whose operation does not critically depend upon coefficients of friction;

It is a further object of the present invention to provide a hinge plate which reliably severs in tension at a weakened line portion and bends about the weakened line portion, while securely and fixedly securing the upper and lower post portions of a signpost to each other;

It is still a further object of the present invention to provide means for facilitating assembly of hinge plates on circular posts;

It is yet a further object of the present invention to provide retaining means made of a substantially flexible material for connecting the upper and lower post portions to each other to assure that the upper and lower post portions remain attached to each other in the event that all of the hinge plates rupture or are severed upon impact;

It is an additional object of the present invention to provide a roadside post safety breakway system for sign panels and the like which incorporates hinge plates of the type generally described above.

It is yet an additional object of the present invention to provide a hinge plate and assembly, the installation of which are substantially foolproof so that improper installation does not appreciably effect the operation thereof.

In order to achieve the above objects, as well as others which will become apparent hereafter, a hinge plate in accordance with the broader features of the present invention comprises a substantially planar plate having first and second portions separated by a weakened line portion. Connecting means are provided for securely connecting the hinge plate to a pair of movable members, such as the flanges of upper and lower post portons used to support a sign panel or the like. The material and configuration of the hinge plate and the weakened line portion is selected to cause the hinge plate to rupture in tension when the movable members are moved away from each other along directions substantially parallel to the plane defined by the hinge plate, and to cause the hinge plate to bend about the weakened line portion to permit the first and second portions to move from substantially co-planar orientations to relative angular displacements up to approximately ninety degrees.

A roadside post safety breakaway system for sign panels and the like in accordance with the present invention comprises a plurality of posts each having upper and lower post portions joined at post cut lines. The sign panel or the line is mounted on the upper post portion proximate to and above the post cut line. Breakaway means releasably connect the lower post portions to footings embedded in the ground or other supporting surface for releasing the lower post portions from the footing upon impact therewith by a moving vehicle. A plurality of hinge plates are provided which are associated with each post. The hinge plates are disposed on opposite sides of the post and bridge the post cut lines. Each hinge plate has a first hinge portion fixedly connected to a respective upper post portion and a second hinge portion fixedly connected to an associated lower post portion to connect associated upper and lower post portions of each post to each other. The first and second hinge portions of each hinge plate are separated by a weakened line portion. The material and configuration of the hinge plate and weakened line portion is selected to cause the hinge plates mounted on the impact side of the post to rupture at the weakened line portion while causing the hinge plates mounted on the side of the post opposite to the impact side to bend. In this manner, impact by a moving vehicle with a post and severance of the breakaway means severs some of the hinge plates and permits the vehicle to deflect the impacted post about the remaining hinge plates while the post remains attached to the associated upper portion and the sign panel or the like to prevent secondary collisions with the advancing vehicle or other objects or persons in the immediate collision area.

BRIEF DESCRIPTION OF THE DRAWINGS

Other objects, features, and advantages of the present invention will become apparent from the following description of the preferred embodiments of the invention, taken together with the following drawings thereof, in which:

FIG. 1 is a perspective view of a roadside post breakaway system for sign panels which incorporates the hinge plates in accordance with the present invention;

FIG. 3 is a fragmented side elevational view of a signpost at the post cut line, showing the manner in which the hinge plates in accordance with the present invention bridge the post cut line and securely fix or connect the upper and lower post portions to each other;

FIG. 4 is a fragmented front elevational view of the post section shown in FIG. 3, showing the manner in which the front hinge plates are mounted on the post;

FIG. 5 is similar to FIG. 3, but showing a modified hinge plate construction adapted to be used with circular posts;

FIG. 6 is similar to FIG. 4, showing the manner in which the modified hinge plate shown in FIG. 5 is mounted on a circular post;

FIG. 7 is a fragmented cross-sectional view taken along line 7—7 in FIG. 6;

DESCRIPTION OF THE PREFERRED EMBODIMENTS

Figure 2:
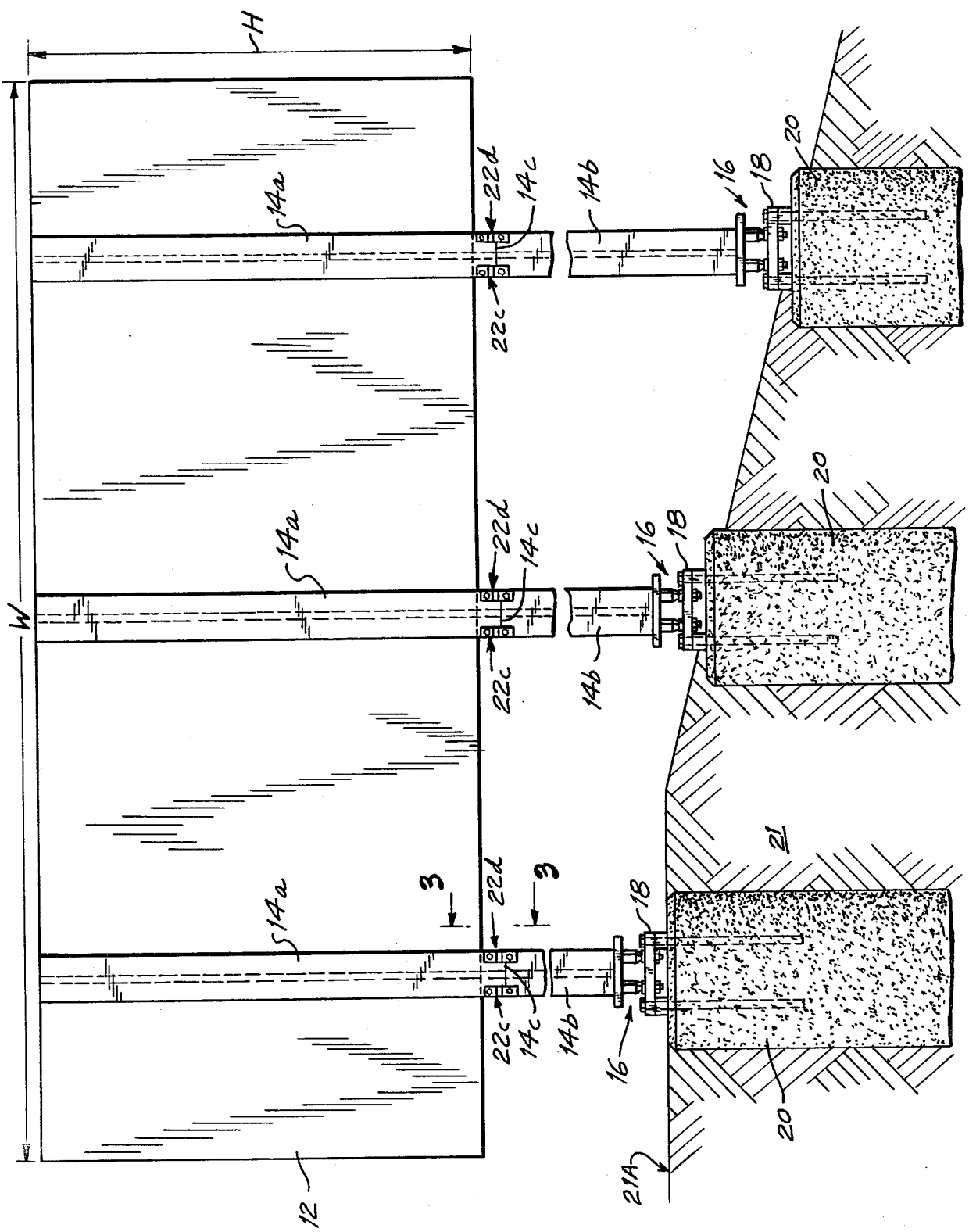
FIG. 2 is a fragmented rear elevational view of the roadside post breakaway system, shown in FIG. 1, showing the arrangement of the rear hinges on the posts and the manner in which the lower post portions are releasably mounted on the footings by means of breakaway assemblies.

Referring now specifically to the drawings, in which identical or similar parts are designated by the same reference numberals throughout, and first referring to FIG. 1, a roadside post safety breakaway system in accordance with the present invention is generally designated by the reference numeral 10.

The roadside post safety breakaway system 10 includes a sign panel 12 which, referring to FIG. 2, is shown to have a height H and a total width W. The sign panel 12 is shown supported on three posts 14 which, in the embodiment being described, are in the nature of "I" posts.

Each of the posts 14 has an upper post portion 14a and a lower post portion 14b joined at post cut lines 14c. As best shown in FIG. 2, the post cut lines 14c of all the posts 14 are substantially horizontally aligned along a line proximate to the sign panel 12. Advantageously, the hinges 22 are brought as close as possible to the sign panel 12 and a distance "D" (FIGS. 3 and 4) typically equal to ⅜ in. has been found satisfactory.

Referring to FIG. 3, the post cut lines 14c are shown to extend across the entire cross-section of the "I" post, unlike the partial cut line used in conjunction with the Texas Highway Department slip base system utilizing the fuse plate arrangement described in the Background of the Invention. For this reason, the upper and lower post portons 14a and 14b respectively must be secured to each other by means of hinge plates, as to be described hereafter.

The posts 14, and more specifically the lower post portions 14b, are releasably connected by means of breakaway assemblies 16 to supporting plates 18 which are in turn fixedly connected to footings 20. The footings 20 are embedded in the ground 21, as best shown in FIG. 2. The upper post portions 14a are all selected to have the same height or length so that the post cut lines 14c are substantially horizontally aligned as suggested above. Where the ground line 21a is level, then all the lower post portions 14b are selected equal in length. However, where there is an incline or the ground line 21a slopes with respect to the horizontal, the lower post portions 14b assume different lengths to compensate for such sloping or uneven ground lines.

The breakaway assemblies 16 to be used in conjunction with the system 10 is not in and of itself critical. Any breakaway assembly which releases the lower post portions 14b from their associated footings 20 upon impact by a vehicle may be used. For example, the breakaway assemblies disclosed in my U.S. Pat. No. 3,951,556 for "Load Concentrated Breakaway Coupling Apparatus," issued on Apr. 20, 1976; and disclosed in my U.S. application Ser. No. 572,427 for "Safety Breakaway Ground Mounted Post Support Assemblies," filed May 2, 1975 may be used. Since the specific breakaway assemblies 16 used in conjunction with the present invention is not critical, and since breakaway assemblies are described in prior U.S. Patents, including my above patent and pending application, the breakaway assemblies will not be described in any great detail. Instead, my above issued U.S. Patent and pending Patent Application are incorporated herein by reference for the disclosures that these contain of my breakaway assemblies.

Generally, the present invention comprises a plurality of hinge plates 22 associated with each post 14. The hinge plates, to be more fully discussed hereafter, are disposed on opposite sides of the post 14 and bridge the post cut lines 14c as best shown in FIGS. 2–4. When "I" posts 14 support the sign panel 12, four hinge plates 22 are used to secure the upper and lower post portions 14a and 14b to each other.

Referring to FIG. 3, the "I" post 14 includes a central web 14d and a pair of opposing end flanges 14e. With such "I" posts, two hinges 22 are mounted on each end flange 14e, the two hinges 22 on each side being mounted substantially at the edges of the flanges 14e on opposite sides of the central web 14d as best shown in FIG. 4.

Since the hinges 22 are similarly mounted on each of the posts 14, it is only necessary to describe the assembly or arrangement at one of the posts, the same description being equally applicable to other posts. For purposes of description only, the side of the post 14 which faces the same side or direction as the front panel 12 will be referred to as the front or collision side of the post 14 while the opposing side will be referred to as the rear or opposing side of the post 14.

Referring to FIG. 4, each post 14 is shown to be provided with spaced hinge plates 22a and 22b. Referring to FIG. 2, each of the signposts is provided at the rear side thereof with a pair of spaced hinge plates 22c and 22d. Each hinge plate 22a–22d has a first hinge portion 22e fixedly connectedto a respective upper post portion 14a and a second hinge portion 22f fixedly connected to an associated lower post portion 14b, to connect associated upper and lower post portions of each post 14 to each other.

Connecting means in the form of bolt 24 and nut 26 combinations are utilized to securely connect the hinge plates 22 to the post. To this end, the first and second hinge portions 22e and 22f are provided with openings in the nature of circular holes 22g which are dimensioned to receive the bolts 24 therethrough. The bolt 24 and nut 26 combinations may be tightened to securely and substantially fixedly connect the first and second portions 22e and 22f to the respective upper and lower post portions 14a and 14b. Washers 28 may be used as shown. The extent to which the nuts 26 are tightened is not critical since the hinge plates 22 do not operate on the friction principle as was the case with the slip base system developed by the Texas Highway Department. While the degree of pre-tensioning on the hinge plate is not critical, the nuts 26 can be tightened to any desired degree unlike the case with the castillated nut approach described in the Background of the Invention. With the above-described arrangement of the present invention, tightening of the bolts 24 and nuts 26 securely fixes the upper and lower post portions 14a and 14b and maintains these post portions securely connected to each other within the design criteria to be more fully discussed hereafter.

An important feature of the present invention is the provision of a weakened line portion which separates the first and second hinge portions 22e and 22f, which weakened portion may be in the nature of a notch 22h. As best shown in FIGS. 3 and 4, the notch 22h in accordance with the embodiment being described is in the nature of a groove a substantially rectangular cross-section.

A further important feature of the invention is that the material and configuration of the hinge plate 22 and weakened line portion 22h are selected to cause the hinge plate 22 mounted on the impact side or front side of the post 14 to rupture in tension at the weakened line portions 22h while causing the hinge plates mounted on the rear side of the post 14 or opposite to the collision side to bend. In this manner, impact by a moving vehicle with the post 14 and severance of the breakaway assemblies 16 severs some of the hinge plates, such as hinge plates 22a and 22b, and permits a vehicle to deflect the impacted lower post portion 14b about the remaining hinge plates, such as hinge plates 22c and 22d, while the impacted lower post portion 14b remains attached to the associated upper post portion 14a and to the sign panel 12 to prevent secondary collisions with an advancing vehicle or other objects or persons in the immediate area.

As will be noted from the above-described figures, the hinge plates 22 are substantially planar plates, rectangular in form and having a rectangular notch or groove 22h separating the first and second portions 22e and 22f. The holes 22g are generally aligned along the length direction of the hinge plate 22.

It has been determined that different hinges are advantageously used with different size or type posts. Table I lists the dimensions $R_1$, $S_1$, $T_1$, $U_1$ and $V_1$ for two hinge model numbers HI-1 and HI-2 useful for commonly used "I" posts. The location of these dimensions are shown in FIG. 4.

TABLE I
HINGE PLATE DATA
ALL DIMENSIONS IN INCHES
"I" POST

| POST SIZE | MODEL NO. | $R_1$ | $S_1$ | $T_1$ | $U_1$ | $V_1$ | h |
|---|---|---|---|---|---|---|---|
| S 4 × 7.7 | HI-2 | ¾ | ⅞ | ¼ | 1 | .071 | ½ |
| W 6 × 8.5 | HI-2 | ¾ | ⅞ | ¼ | 1 | .071 | ↑ |
| W 6 × 12 | HI-1 | 1 | 1⅜ | ⅜ | 1½ | .113 | ↑ |
| W 6 × 15.5 | ↑ | ↑ | ↑ | ↑ | ↑ | ↑ | ↑ |
| W 8 × 17 | | | | | | | |
| W 8 × 20 | | | | | | | |
| W 10 × 21 | | | | | | | |
| W 10 × 25 | | | | | | | |
| W 12 × 27 | ↓ | ↓ | ↓ | ↓ | ↓ | ↓ | ↓ |
| W 14 × 30 | HI-1 | 1 | 1⅜ | ⅜ | 1½ | .113 | ½ |

CIRCULAR POST

| DIAMETER | WALL THK. | MODEL | $K_1$ | $L_1$ | $M_1$ | $N_1$ | $P_1$ | $Q_1$ | $T_1$ | h | $U_1$ |
|---|---|---|---|---|---|---|---|---|---|---|---|
| 8 – 12" | — | CI-1 | ⅞ | 1⅜ | 1 | 1¼ | 2 | .162 | ½ | ⅝ | 2 |
| 4" – 6" | — | CI-2 | ⅝ | 1⅓ | ¾ | ⅞ | 1¼ | .111 | ⅜ | ½ | 1¼ |

Once an "I" post size has been determined, Table I can be used to select a hinge having the dimensions there specified. The material for the hinge plate used for the models HI-1 and HI-2 is 4130 or 4330 steel or the equivalent thereof. As will be more fully described below, the dimensions of the hinge plates in Table I are primarily based upon the anticipated moments that can be developed at the post cut lines 14c, the Texas Transportation Institute test data, as it appears in U.S. Steel Handbook and the "Standard Specifications for Structural Supports for Highway Signs, Luminaires and Traffic Signals" by the American Association of State Highway and Transportation Officials (hereinafter referred to as "AASHTO"). The AASHTO standards are revised from time to time and, therefore, the dimensions in Table I may similarly have to be revised. Such revisions would be evident to one skilled in the art in view of such modified standards.

As mentioned above, the design of the hinge plates is based upon the data issued by the Texas Transportation Institute with respect to the slip base system which utilized a fuse plate arrangement described in the Background of the Invention. This data appears in the Institute's manual entitled "Break-Away Roadside Sign Support Structures." As noted above, the slip base system relies upon residual tensions which are applied to the fuse plate by pre-tensioning the nut and bolt combinations. Based on tests, the coefficients of friction were determined, and from this the allowable load on the fuse plate in tension can be calculated for given post sizes or posts having predetermined depths. The hinge plates of the present invention, while they do not operate on the slip base principle, utilize the residual tension values determined to be satisfactory by the Texas Transportation Institute as the starting point for the design of the hinge plates in Table I. The necked down portion where the groove 22h appears is designed to rupture in tension at substantially the same impact loads as specified in the Texas data. Thus, the necked down portions of the hinge plage 22 are designed to rupture at substantially the same tension loads as were required to cause slipping of the fuse plates.

By way of example only, some considerations will now briefly be examined with respect to the design of the HI-1 hinge plate. Starting from the Texas breakaway data as recorded in the "U.S. Steel Safety Manual," the maximum tension force in a flange of an "I" post 14 developed by a ¾ diameter bolt is approximately 28,000 lbs in pre-tension. Since the Texas Transportation Institute tests indicate that the range of coefficients of friction in the slip base system ranges between 0.17–0.26, the maximum release load in tension in the hinge plate is approximately 29,000 lbs. The minimum tension force upon impact, based on the lower coefficient of friction is approximately 19,000 lbs. While the 29,000 lbs. figure has been utilized in the design of the hinge plate 22 itself, a lower post design load of 24,000 lbs. has been assumed for the hinge plates for the purposes of post selection. This is to assure that the hinge plates 22 do not prematurely rupture due to wind load conditions.

The maximum horizontal load from wind can be estimated for various areas or zones. Assuming the maximum horizontal load from 100 mph winds, and assuming the maximum sign width of 15 ft. per post and a length to width ratio of 2 with each post having a maximum post depth of 14 in., the wind load pressure can be calculated to be equal to 51.484 lbs. per square foot. Assuming a maximum tension load on the hinges of 29,120 lbs., the maximum moment developed by the hinge plates at the post cut lines 14c is approximately 33,973 ft. lbs. This maximum moment which can be sustained by the hinge plates must be developed at the center of gravity of the sign panel where the wind load is assumed to act so that the height of such a sign panel may be calculated at 9.38 ft. The maximum horizontal load acting on the sign panel 12 per post may be computed from the wind factor and the sign panel area per post and this quantity has been calculated to be equal to 7,244 lbs. and represents the maximum or worst possible horizontal load which can be expected to act on a sign panel.

As mentioned above, the hinge plates may be made from 4130 or 4340 steel. Clearly, any other material which satisfies the design criteria may similarly be used as can equivalents of these two mentioned steels. With respect to the 4130 or 4340 steels, which are heat treated to produce a minimum ultimate tensile stress of 90,000 psi and the maximum ultimate tensile stress of 108,000 psi with a minimum yield stress of approximately 70,000 psi. The minimum allowable tensile force can be calculated by dividing the minimum yield of 70,000 psi by an AASHTO safety factor and multiplication by another AASHTO constant representing an allowable overstress for the steel under combined loading.

To calculate the areas of minimum breaking load at the necked-down portion 22h of the hinge 22, the minimum breaking or design load of 14,560 lbs./hinge is divided by the minimum ultimate tensile stress of 90,000 psi to yield 0.162 sq. in. for the necked-down area. Assuming that the width of the hinge $U_1$ is equal to 1.5 in., the thickness $V_1$ at the neck-down portion of the hinge 22 is calculated to be 0.108 in. This is the minimum thickness of the necked-down portion and the actual value which has been selected is 0.113 ± 0.004 inches, $V_1$ in Table I, and this has been found to provide satisfactory results.

With the design of the hinge plates 22 as suggested above, the hinge plates are to rupture at the necked-down area or at the notch 22h only. Accordingly, in the design of the hinge plate, a check must be made, particularly at the bolt holes 22g, to insure that the hinge plate does not rupture at the areas about the holes 22g of minimum width. Based on such a check, and to insure that rupture takes place at the necked-down portion and not anywhere else on the hinge plate, it has been calculated that the thickness $T_1$ of the hinge plate HI-1 can be a minimum of 0.345 in. and, therefore, a ⅜ in. thick plate has been used.

The second or lower portions 22f of the hinge plates 22 extend above the post cut lines 14c as described above. The purpose for such an arrangement is to insure that the horizontal wind loads developed upon the sign panel 12 are transmitted to the lower post portions 14b through the lower or second hinge portions 22f without deforming or otherwise bending the same. This quantity has been previously calculated to be equal to 7244 lbs. It is assumed that friction developed from the bending moment between the upper and lower post portions 14a and 14b transfers some of this horizontal load to the lower post 14b, and this has been calculated to be approximately equal to 4,950 lbs., the rear hinges 22c and 22d must carry the difference between 7,244 and 4,950 lbs. or 2,294 lbs. It will be appreciated that the upper post portions 14a will abut against bearing areas of the lower hinge portions 22f which are disposed above the post cut lines 14c. In order to provide adequate bearing areas of the upper post portions 14a against such bearing areas of the lower hinge portions 22f, and assuming that the posts 14 are made from A-36 steel having an allowable bearing stress of 29,000 psi, the distance "d" in FIGS. 3 and 4 has been calculated to be 0.018 inch, based on the load of 2,294 lbs. which the lower portion 22f of the hinge plate 22 must transfer to the lower post portion 14b, when the AASHTO standards safety factors are taken into account. This represents a minimum height above the post cut lines 14c and it has been found that a distance "d" of one-quarter of an inch is satisfactory for the purposes intended.

The distance "h" has been arbitrarily selected to be equal to about ½ in. to permit bending of said first and second hinge portions relative to each other up to and including relative angular displacements up to 90° without abutting and interference between said first and second hinge portions.

An additional check must be made to insure that the thickness of the plate $T_1$ is sufficient to prevent bending of the lower hinge portion 22f due to the horizontal wind load which must be transmitted by the upper post portion 14a to the lower post portion 14b. For this purpose, it is assumed that the horizontal wind load of 2,294 lbs. acts at the center of bearing areas at d/2 of the lower hinge portions 22f above the post cut lines 14c. The distance between the axes of the holes 22g and the center of the bearing areas on which this horizontal force acts on the lower hinge portion 22f is used to compute the moment at the hole 22g axis where the hinge plate 22 is fixed to the post. The thickness $T_1$ of the hinge plate can again be computed based upon an allowable tensile stress of 56,388 psi. From these calculations, the thickness $T_1$ has been calculated to be equal to 0.403 in. However, because some of this moment can be taken up by the bolts 24 due to bolt fixity, it has been determined that the previously computed value of ⅜ in. thickness for the hinge plate 22 is sufficient. The bolts themselves must be checked to insure that they will not shear or fail in tension under the above-described stresses and it has been determined that with respect to the HI-1 hinge plates which utilize ¾ in. bolts, that these have sufficiently high strength to withstand the anticipated stresses.

Similar design considerations have been made to calculate the dimensions for the hinge model No. HI-2 and these dimensions are set forth in Table I. It should be clear that the dimensions for $T_1$ and $V_1$, for example, may be varied by selecting different arbitrary values for $U_1$. Additionally, the values set forth in Table I may be modified by taking into account different safety factors or different worst possible conditions. Further, these quantities may change from time to time, as suggested above, due to the changing standards issued by AASHTO since the various safety factors and allowable overstresses for the materials used may be changed from time to time. For these reasons, while the dimensions in Table I are illustrative and intended as an aid to select a hinge plate for a particular post size, these dimensions may be modified from time to time as would be evident to one skilled in the art. With respect to all of the hinge plates which form the presently preferred embodiments of the present invention, these are made from alloyed steel which conforms to AISI 4340, 4130 or an equivalent material and should have a minimum tensile yield stress of 70,000 psi and an ultimate tensile stress range of 90,000 to 108,000 psi. The hinge plate model No. HI-1 has a tensile breaking strength range of 14,600 – 18,000 lbs. while the model No. NI-2 has a tensile breaking strength range of 6,260 – 7,500 lbs. These values are not in and of themselves critical although they have been found to provide satisfactory results.

Referring to FIGS. 5-7, a circular post 30 is shown which has an upper post portion 30a and a lower post portion 30b joined to each other at a post cut line 30c.

The upper and lower post portions 30a and 30b are fixed to each other by means of hinge plates 32a and 32b, each of which respectively has an upper hinge portion 32c and a lower hinge portion 32d. The upper and lower hinge portions 32c and 32d are separated from each other by means of a notch 32e which is in the form of a rectangular groove similar to that which appeared on the hinge plate 22. It is also possible to use a curved shaped groove. Also the hinge plates could be circular or of other cross-sections beside rectangular or square. Being that the wall of the circular post 30 is curved, only two hinge plates 32a and 32b are used since such hinge plates in any event are advantageously mounted on the opposing sides of a post. Since only two hinge plates are utilized, the dimensions are somewhat different and these are set forth in Table I. An important difference is that two circular holes are provided on each hinge portion 32c and 32d so that two nut and bolt combinations 24, 26 can be utilized on each side of the notch 32e to fixedly secure the hinge plates 32a and 32b to the post 30.

Since the wall of the circular post 30 is curved, washers 26a are advantageously used as best shown in FIG. 5 to space the bolts from the circular wall and prevent engagement therewith.

Since the interior of the circular post 30 becomes inaccessible once the upper and lower post portions 30a and 30b are joined at the post cut line 30c, a retaining plate 34 is advantageously used which is initially connected to the circular post wall by means of a bolt 36 and a nut 39 as shown in FIGS. 5-7. Two nuts are spot welded or otherwise connected to the retaining plate 34, which has holes aligned with the hinge plate holes once the plate is mounted on the circular wall. In this manner, the nuts 26 are properly aligned behind the holes of the circular post wall and maintained in those aligned positions after the post portions are joined to each other so that the bolts can be threadedly engaged therewith without having direct access to such nuts. Referring to FIG. 7, the spot weld 40 are shown although, it should be clear, any other means for attaching the nuts 26 to the retaining plate 34 may be used. Still referring to FIG. 7, the hinge plate 32a is shown to have a flat outer or exposed surface while the surface thereof which abuts against the circular post 30 is arcuate and mates with the curvature of the circular post. However, this is not a critical feature of the present invention and, as shown by the dashed outline 42 in FIG. 7, the hinge plate 32a may be a totally flat plate and similar to that used in conjunction with "I" posts.

Two model types, namely Model CI-1 and CI-2, have been developed for use with circular posts. These two models are intended to be used with different diameter posts and these are listed in Table I. The dimensions for each of the hinges is similarly set forth in that Table and the same comments apply to those dimensions as to the earlier described hinge dimensions. Therefore, the dimensions indicated for Models CI-1 and CI-2 may be changed by varying some of the initially arbitrarily selected dimensions. Additionally, these dimensions may change due to the changes in safety factor standards issued by AASHTO. The hinge plates CI-1 and CI-2 are made from the same materials as specified above with respect to the earlier described hinges. Under these circumstances, the hinge plate CI-1 shall have a tensile breaking strength range between 29,100 and 36,000 lbs. while the hinge plate CI-2 shall have a tensile breaking strength range between 12,500 and 15,000 lbs. With respect to all of these tensile breaking strength ranges, these are primarily based upon the Texas test data as reported in the U.S. Steel Safety Manual described above.

The materials used, such as the 4130 steel, is therefore required to have sufficient ductility to permit bending about the notched area while being sufficiently strong to withstand the anticipated tensile stresses. In this connection, it is necessary to heat-treat the 4130 steel to make it somewhat more brittle. It has been found that heat-treating of the 4130 steel to approximately a Rockwell B hardness in the range of between 93 and 95 provides satisfactory results when used for hinge plates.

With respect to the hinge plates 32a and 32b, these are advantageously mounted on diametrically opposite sides of the circular post 30 and the bolt holes are advantageously aligned along a direction substantially parallel to the length direction of the hinge plates.

It will be noted that the upper and lower hinge portions with respect to each of the hinges described above are securely fixed by means of bolt and nut combinations to an associated upper or lower post portion. The bolts themselves do not shear and there is no slipping that takes place of the hinge plates relative to the bolts. Upon impact, some of the hinges rupture in tension at the notched area while the balance of the hinges bend at that same area, as will be described more fully with respect to FIG. 8.

Figure 8:
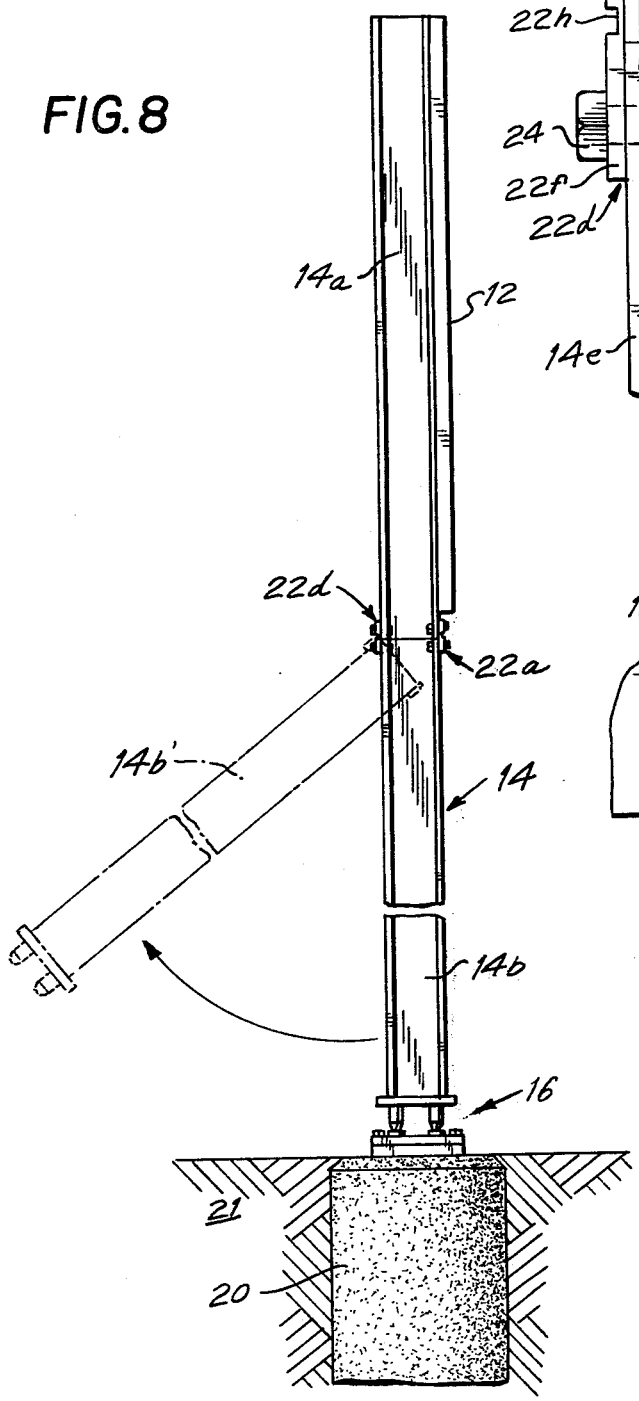
FIG. 8 is a side elevational view of the roadside post breakaway system as shwon in FIG. 1, showing the manner in which an impacted post is released at the footing to pivot about the rear hinges after the front hinges have been severed as a result of an impact by an advancing vehicle.

In FIG. 8, a sign panel 12 is shown mounted on posts comprising upper post portions 14a and lower post portions 14b. Two hinges 22a and 22b are mounted on the front side of each post 14, as described above, and two hinges 22c and 22d are mounted on the reverse or opposite side of the posts. Upon impact by a moving vehicle, the lower post portion 14b is released from its footing 20 at the breakaway assembly 16. The tensile stresses at the hinges 22a and 22b are such as to rupture the two front hinge plates 22a and 22b and deflect the impacted post 14b' about the remaining or rear hinge plates 22c and 22d while the post remains attached to the upper post portion 14a and the sign panel 12 to prevent secondary collisions with an advancing vehicle or other objects or persons in the immediate collision area.

Advantageously, the posts 14 are so oriented so that the front flanges 14e upon which the hinge plates 22a and 22b are mounted face the general direction from which impact is anticipated. When so arranged, the hinge plates 22a and 22b rupture as described above and the hinge plates 22c and 22d act as hinges about which the impacted post pivots. Clearly, if the posts shown in FIG. 8 are impacted from the rear, the rear hinge plates 22c and 22d are the ones to rupture while the hinge plates 22a and 22b are the ones that act as pivots which retain the impacted post and prevent the same from separating from the sign panel assembly.

Figure 9:
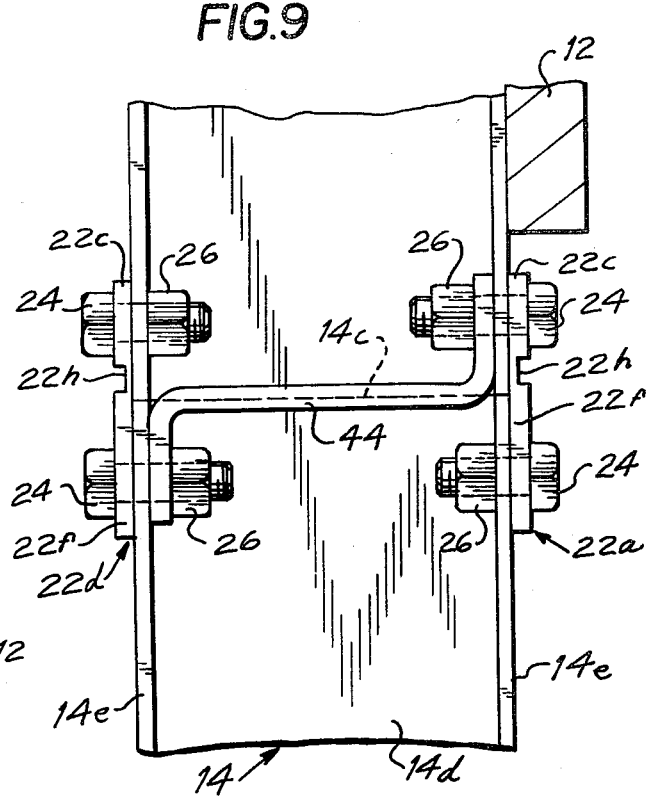
FIG. 9 is similar to FIG. 3, but showing additionally a strap made from a soft and relatively flexible material for ensuring that the upper and lower post portions remain attached to each other upon impact in the event that all of the hinge plates are ruptured or severed.
Figure 10:
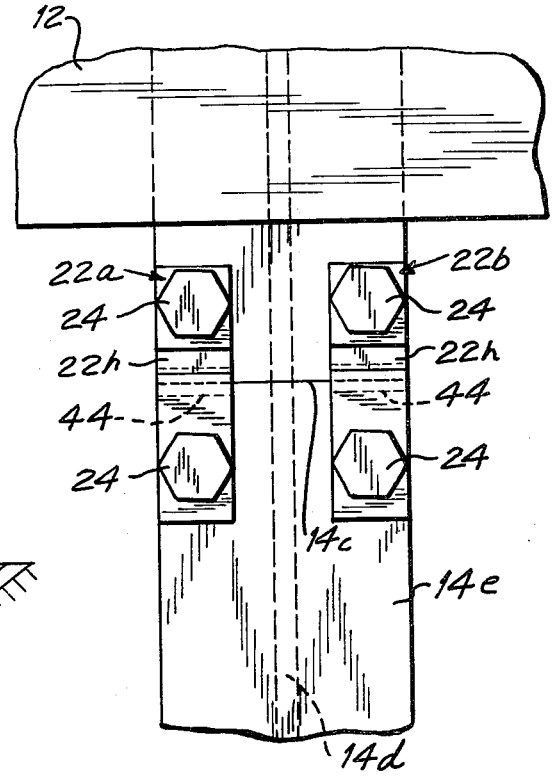
FIG. 10 is similar to FIG. 4, but showing in dashed outline the straps shown in FIG. 9.

In the event that a post 14 is impacted from a side other than the front or rear side of the post as discussed above, there is a possibility that all of the hinge plates 22a-22d will sever or rupture in tension. This is most likely to occur when the posts are hit from the side. To prevent the impacted post from separating from the sign panel assembly and thereby possibly become a flying missile, there may advantageously be provided a retaining means or mechanism in the nature of a strap 44 as shown in FIGS. 9 and 10. The strap 44 is advantageously made from a material substantially softer or more flexible than the materials from which the posts and hinge plates are made. Being connected to both the upper and lower post portions as best shown in FIG. 9, the strap 44 is effective in maintaining the upper and lower post portions 14a and 14b attached to each other even in the eventuality that all of the hinge plates are ruptured. Instead of a solid strap 44 as shown, a chain, wire mesh rope or other similar soft and elongate material may be utilized. While two straps 44 are shown in FIG. 10, one on each side of the central web 14d and associated with each pair of opposing hinge plates, it is only necessary to utilize one such strap since this is normally sufficient to maintain the post portions attached to each other.

The hinge plates of the present invention have been described above as have been some of the design considerations in selecting the dimensions for such hinge plates. The process of selection of post sizes or types is well known to those skilled in the art. Having selected a sign or panel size and shape, the wind load or wind pressure in pounds per square foot can be computed. Based upon the wind pressure, which is assumed to act at the center of gravity of the sign panel, the moment which acts on each post at the base may be calculated. Knowing the maximum anticipated moment at the base of each post, a suitable post may be selected based on the design properties of the post and the AASHTO standards. The design properties of posts may be found in the "Manual of Steel Construction," published by the American Institute of Steel Construction, Inc. (AISC).

After a post size or type has been selected, and the effective width or depth of the post is known, namely the distance between opposing hinge plates, the maximum allowable moment which may be experienced by the hinge plates may be estimated by multiplying the post depth times 24,000 lbs. which, as mentioned above, is the maximum tension force to be applied to a pair of HI-2 hinge plates when considering wind load factors. For example, if a post has a depth of 6 in., the maximum allowable moment at the hinges is 144,000 in. lbs. The actual moment at the notches or post cut lines is calculated based on the wind pressure and the distance between the center of gravity where such wind load is acting on the sign panel and the notch. Such a hinge check must show that the maximum allowable moment permitted for the hinges with respect to wind loads is greater than the actual calculated moment based on the anticipated wind loads in the region or zone in question. Once this condition has been satisfied, the selected posts and hinge plates may be used.

The advantages of the hinge plates in accordance with the present invention will readily become apparent as will the advantages over the prior art comparable approaches. Firstly, it is to be noted that the hinge plates of the present invention have a controlled breaking range, as enumerated above, which is substantially independent of both torquing or field installation. These controlled breaking ranges are not affected by weather or temperature and are simply determined by the dimensions of the integral hinge plate. Since the hinge plate of the present invention is designed to rupture in tension upon predetermined loads, the hinge plates will function from vehicle impact in all directions. For this reason, the hinge plates can be installed in the field in any direction and still function properly. This makes the hinge plate of the present invention fullproof and usable under all circumstances. After impact, only the hinge plate need be replaced since the posts are normally reusable.

A most important feature of the present invention is that the hinge plate described above will break upon impact, if they are positioned on the impact side, or act as an integral hinge which bends without breaking so as to retain the joined upper and lower post portions to each other. This permits the released post to move ahead of the advancing vehicle while preventing secondary collisions with the advancing vehicle or other objects or persons in the immediate collision area.

It is to be understood that the foregoing description of the various embodiments illustrated herein is exemplary and various modifications to the embodiments shown herein may be made without departing from the spirit and scope of the invention.

What is claimed is:

1. A roadside post safety breakaway system for sign panels and the like, comprising a plurality of posts each having upper and lower post portions joined at post cut lines, the sign panel or the like being mounted on the upper post portions proximate to and above said post cut lines; breakaway means for removably connecting said lower post portions to footings embedded in the ground or other supporting surface and for releasing said lower post portions from the footings upon impact therewith by a moving vehicle; and a plurality of hinge plates of substantially planar configuration associated with each post, at least one pair of plates being spaced from each other and disposed on opposite sides of said posts each of said plates being independently fixedly connected to its respective side of said posts and bridging said post cut lines, each hinge plate having a first hinge portion fixedly connected to a respective upper post portion and a second hinge portion fixedly connected to an associated lower post portion to connect associated upper and lower post portions of each post to each other, said first and second hinge portions of each hinge plate being separated by a weakened line portion, the material and configuration of said hinge plate and weakened line portion being selected to cause the hinge plates mounted on the impact side of said posts to rupture substantially in tension only at said weakened line portion while causing the hinge plates mounted on the side of said posts opposite to said impact side to bend, whereby impact by a moving vehicle with a post and severance of said breakaway means severs some of said hinge plates and permits the vehicle to deflect the impacted post about the remaining hinge plates while the post remains attached to the associated upper post portion on the sign panel or the like to prevent secondary collisions with the advancing vehicle or other objects or persons in the immediate collision area.

2. A system as defined in claim 1, wherein said posts are "I" posts and two hinge plates are provided on each of the flanges on opposing sides of each of said posts.

3. A system as defined in claim 2, wherein each of said first and second hinge portions are provided with an opening; and further comprising connecting means extending through said openings and said flanges for securely fixing said hinge plate portions to said "I" posts.

4. A system as defined in claim 3, wherein said openings are circular holes, and said connecting means comprises nut and bolt combinations tightened to securely fix said hinge portions to said posts.

5. A system as defined in claim 1, wherein said posts are circular posts and a pair of hinge plates are mounted on diametrically opposite sides of each of said circular posts.

6. A system as defined in claim 5, wherein each of said first and second hinge portions is provided with two openings; and further comprising connecting means extending through each of said openings and the walls of said circular posts for securely fixing said hinge plate portions to the circular posts.

7. A system as defined in claim 6, wherein said openings are circular holes, and said connecting means comprise nut and bolt combinations tightened to securely fix said hinge portions to said posts.

8. A system as defined in claim 6, wherein said openings are aligned along a line generally parallel to the length direction of said posts.

9. A system as defined in claim 1, wherein said second hinge portions extend above said post cut lines, whereby said weakened line portions are disposed above the post cut lines, whereby horizontal loads can be transferred from said upper to said lower post portions through said second hinge portions without bending said hinge plates about said weakened line portions.

10. A system as defined in claim 1, wherein said weakened line portion comprises a notch in the form of a groove to thereby provide a region of reduced cross-section.

11. A system as defined in claim 10, whereby said groove has a rectangular cross-section.

12. A system as defined in claim 11, wherein the height of said groove along the general direction parallel to said posts is selected to permit bending of said first and second hinge portions relative to each other up to and including relative angular displacements up to 90° without abutting an interference between said first and second hinge portions.

13. A system as defined in claim 12, wherein said groove height is approximately half inch.

14. A system as defined in claim 10, wherein the cross-sectional area in the region of said reduced cross-section is selected to permit severance of said hinge plate at said weakened line portion at a predetermined tension load.

15. A system as defined in claim 1, wherein at least one of said posts is circular, and further comprising nut and bolt combinations associated with each of said first and second hinge plate portions tightened to securely fix said hinge plates to the walls of said posts; and a retaining plate disposed within the interior of one of said upper and lower post portions, said retaining plate being connected to several of said nuts to align the same with the associated hinge plate portions and bolts to facilitate assembly of said hinge plates on said circular posts.

16. A system as defined in claim 1, wherein said post cut lines of all said posts are substantially horizontally aligned along a line proximate to the sign panel or the like.

17. A system as defined in claim 1, wherein said hinge plates are disposed proximate to the sign panel or the like.

18. In a roadside post safety breakaway system for sign panels and the like, wherein a sign panel or the like is mounted on the upper post portions of at least two posts, the posts having lower post portions joined to said upper post portions at post cut lines in the region below and proximate to the sign panel or the like, and breakaway means for removably connecting said lower post portions to footings embedded in the ground or other supporting surface and for releasing said lower post portions from the footings upon impact therewith by a moving vehicle, the improvement comprising a plurality of hinge plates of substantially planar configuration associated with each post, at least one pair of hinge plates being spaced from each other and cut lines, each hinge plate having a first hinge portion independently fixedly connected to a respective upper post portion and a second hinge portion independently fixedly connected to an associated lower post portion to connect associated upper and lower post portions of each post to each other, said first and second hinge portions of each hinge plate being separated by a weakened line portion, the material and configuration of said hinge plate and weakened line portion being selected to cause the hinge plates mounted on the impact side of said posts to rupture substantially in tension only at said weakened line portion while causing the hinge plates mounted on the side of said posts opposite to said impact side to bend, whereby impact by a moving vehicle with a post and severance of said breakaway means severs some of said hinge plates and permits the vehicle to deflect the impacted post about the remaining hinge plates while the post remains attached to the associated upper post portion and the sign panel or the like to prevent secondary collisions with the advancing vehicle or other objects or persons in the immediate collision area.

* * * * *